US009405937B2

(12) United States Patent
Malka et al.

(10) Patent No.: US 9,405,937 B2
(45) Date of Patent: Aug. 2, 2016

(54) METHOD AND APPARATUS FOR SECURING A DYNAMIC BINARY TRANSLATION SYSTEM

(71) Applicant: Intel Corporation, Santa Clara, CA (US)

(72) Inventors: Lior Malka, San Jose, CA (US); Koichi Yamada, Los Gatos, CA (US); Palanivelrajan Shanmugavelayutham, San Jose, CA (US); Barry E. Huntley, Hillsboro, OR (US); Scott D. Rodgers, Hillsboro, OR (US); James D. Beaney, Jr., Raleigh, NC (US)

(73) Assignee: INTEL CORPORATION, Santa Clara, CA (US)

( * ) Notice: Subject to any disclaimer, the term of this patent is extended or adjusted under 35 U.S.C. 154(b) by 125 days.

(21) Appl. No.: 13/930,766

(22) Filed: Jun. 28, 2013

(65) Prior Publication Data

US 2015/0007304 A1 Jan. 1, 2015

(51) Int. Cl.
*G06F 21/74* (2013.01)
*G06F 21/54* (2013.01)

(52) U.S. Cl.
CPC ............. *G06F 21/74* (2013.01); *G06F 21/54* (2013.01)

(58) Field of Classification Search
CPC ............. G06F 11/073; G06F 11/0721; G06F 11/0793; G06F 12/1491; G06F 9/3863; G06F 21/566
USPC ................................................ 726/17, 24, 29
See application file for complete search history.

(56) References Cited

U.S. PATENT DOCUMENTS

| 4,787,031 | A * | 11/1988 | Karger et al. ............. 718/100 |
| 7,124,274 | B2 * | 10/2006 | Watt et al. ................. 711/202 |
| 7,734,895 | B1 | 6/2010 | Agarwal et al. |
| 2007/0050555 | A1 | 3/2007 | Ferren et al. |
| 2008/0244538 | A1 | 10/2008 | Nair et al. |
| 2009/0307430 | A1 * | 12/2009 | Bruening et al. .......... 711/119 |
| 2010/0005474 | A1 | 1/2010 | Sprangle et al. |
| 2010/0274551 | A1 | 10/2010 | Das et al. |
| 2014/0006739 | A1 * | 1/2014 | Dixon .............. G06F 12/1491 711/163 |

FOREIGN PATENT DOCUMENTS

| TW | 201112118 A | 4/2011 |
| TW | 201140435 A | 11/2011 |

OTHER PUBLICATIONS

Chien-Te Liu et al. (CASL Hypervisor and its Virtualization Platform, May 2013, ISCAS IEEE, 4 pages).*
Notification Concerning Transmittal of International Preliminary Report on Patentability for International Application No. PCT/US2011/067654, mailed Jul. 10, 2014, 6 pages.
International Search Report and Written Opinion for International Application No. PCT/US2011/067654, mailed Sep. 5, 2012, 9 pages.
Taiwan Office Action and Taiwan Search Report for foreign counterpart Taiwan Application No. 101147868, mailed Sep. 24, 2014, 46 pages.

* cited by examiner

*Primary Examiner* — Saleh Najjar
*Assistant Examiner* — Oleg Korsak
(74) *Attorney, Agent, or Firm* — Nicholson De Vos Webster & Elliott LLP (57) ABSTRACT

A processor and method are described for managing different privilege levels associated with different types of program code, including binary translation program code. For example, one embodiment of a method comprises entering into one of a plurality of privilege modes responsive to detecting the execution of a corresponding one of a plurality of different types of program code including native executable program code, translated executable program code, and binary translation program code. In one embodiment, the binary translation program code includes sub-components each of which are associated with a different privilege level for improved security.

24 Claims, 9 Drawing Sheets

METHOD AND APPARATUS FOR SECURING A DYNAMIC BINARY TRANSLATION SYSTEM

BACKGROUND

1. Field of the Invention

This invention relates generally to the field of computer processors and software. More particularly, the invention relates to an apparatus and method for securing a dynamic binary translation system.

2. Description of the Related Art

In prior binary translation implementations, the binary translation software is loaded from persistent storage such as the platform flash read only memory (ROM) into a predefined area in the system random access memory (RAM). The dynamically translated binary code is then stored in a part of the remaining system RAM, called the "Translation Cache." The rest of the remaining memory is available for x86 software including the basic input output system (BIOS), operating system (OS) and applications. Prior solutions alternate between binary translation software execution for interpreting or translating the x86 binaries and translated code execution for executing the translated code.

Because prior implementations operate at single privilege level for accessing the processor resources (e.g., register states, memory regions, IO regions and the type of instructions), the binary translation memory configuration and the processor transitions between binary translation software execution and translated code execution lead to security vulnerabilities, allowing translated code to access system RAM, and maliciously modify the binary translation software. As another example, since the binary translation software code has full access to the entire memory, it can compromise data that belongs to the translator as well as translated code. These and other vulnerabilities can compromise the security of the binary translation software, or the security guarantees provided to the original translated code, or both.

The embodiments of the invention described herein provide techniques for mitigating some of these vulnerabilities.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1A:
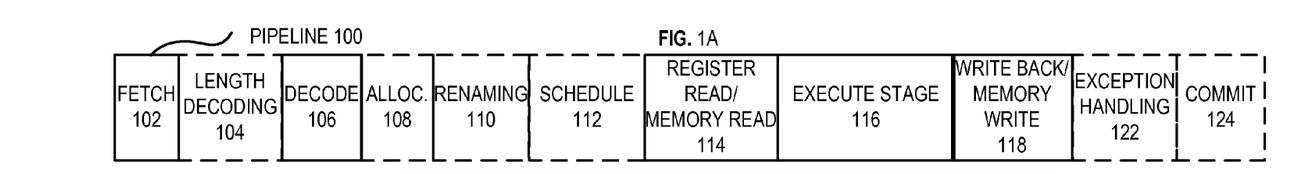
FIG. 1A is a block diagram illustrating both an exemplary in-order pipeline and an exemplary register renaming, out-of-order issue/execution pipeline according to embodiments of the invention.
Figure 1B:
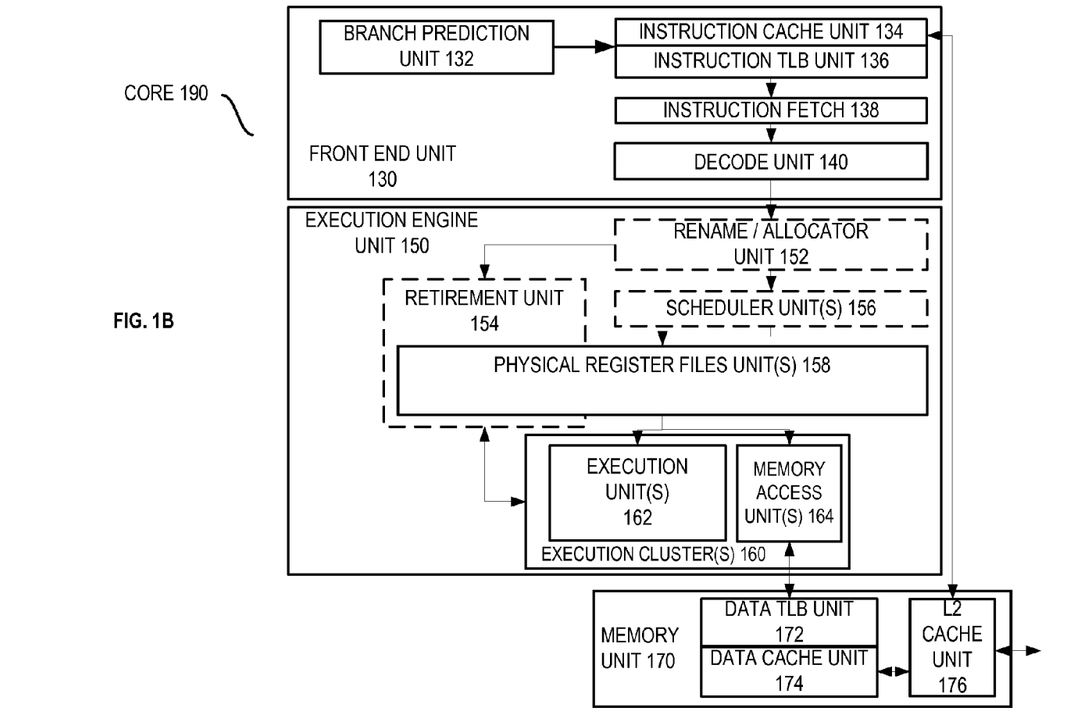
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
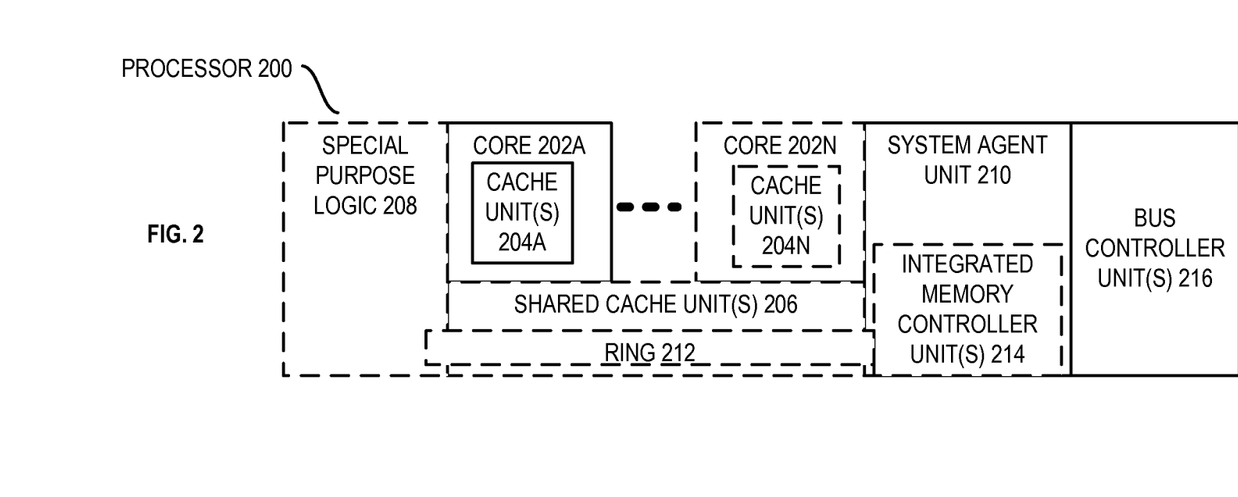
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
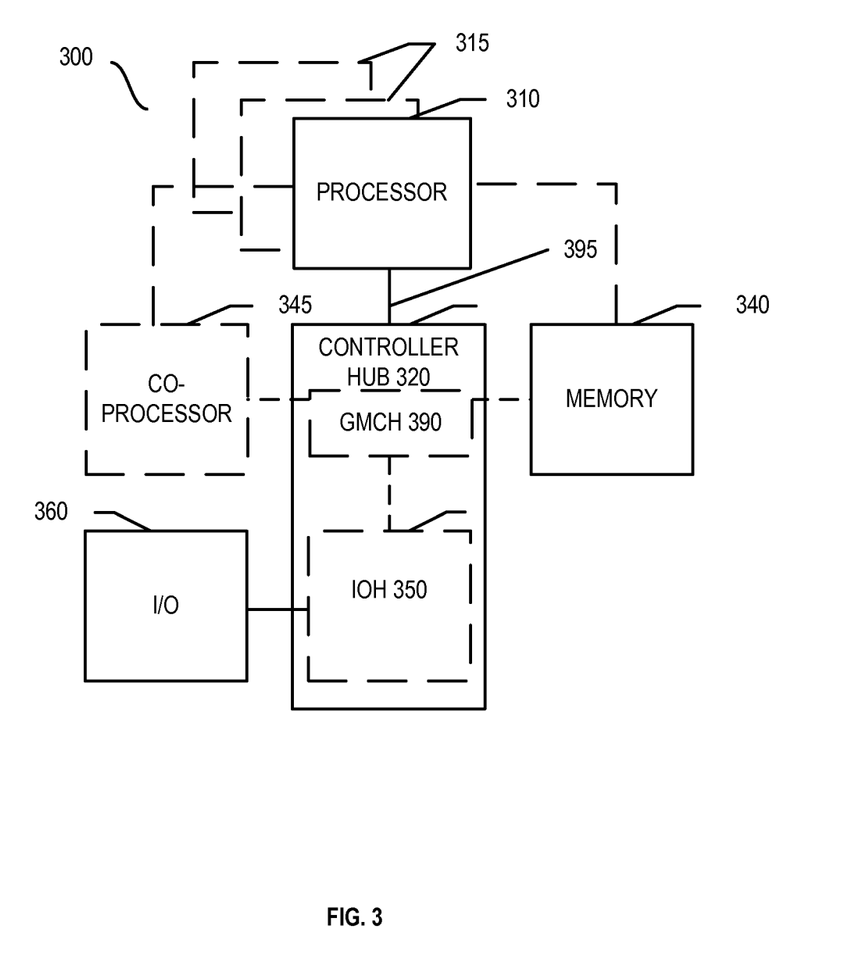
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
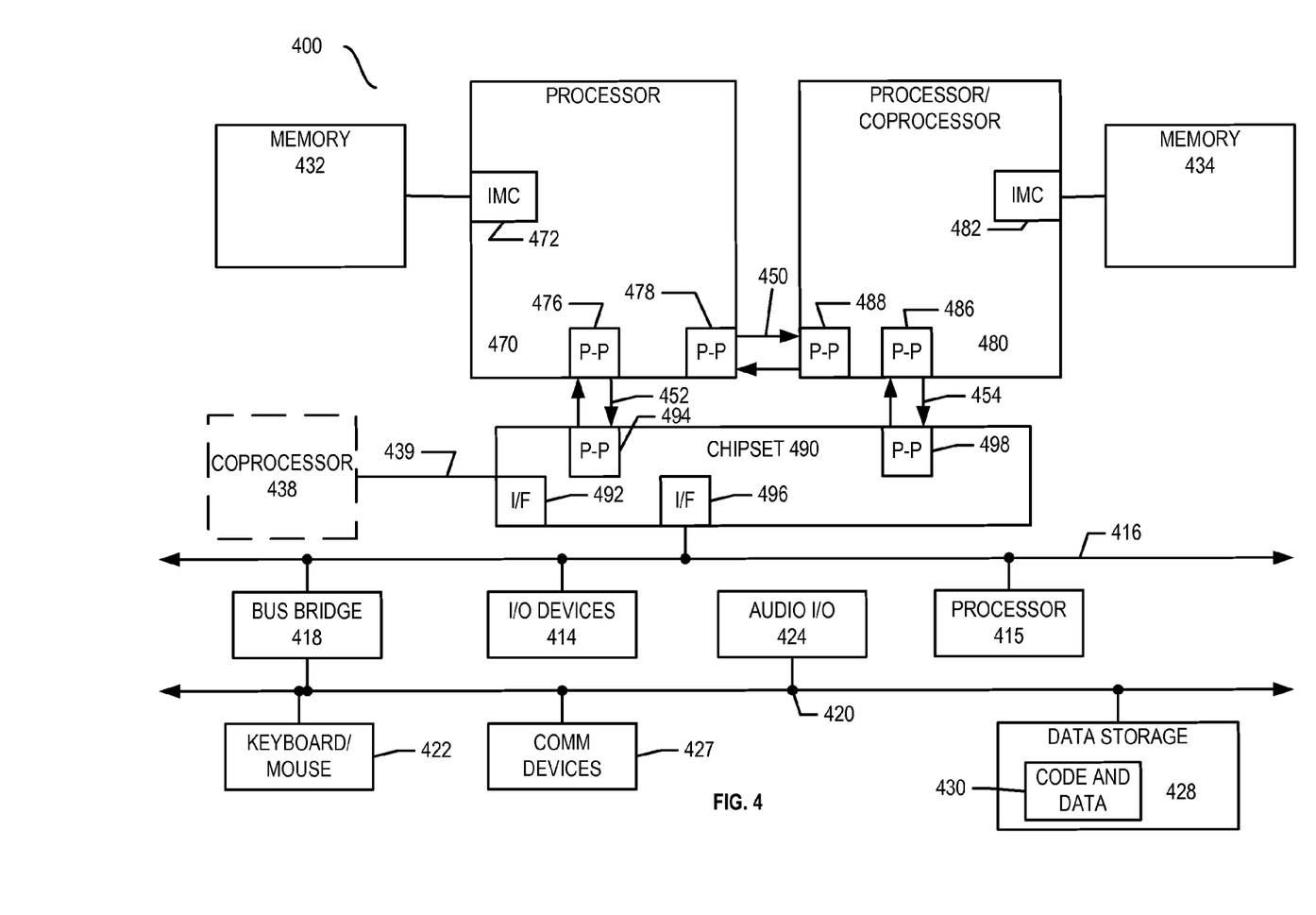
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
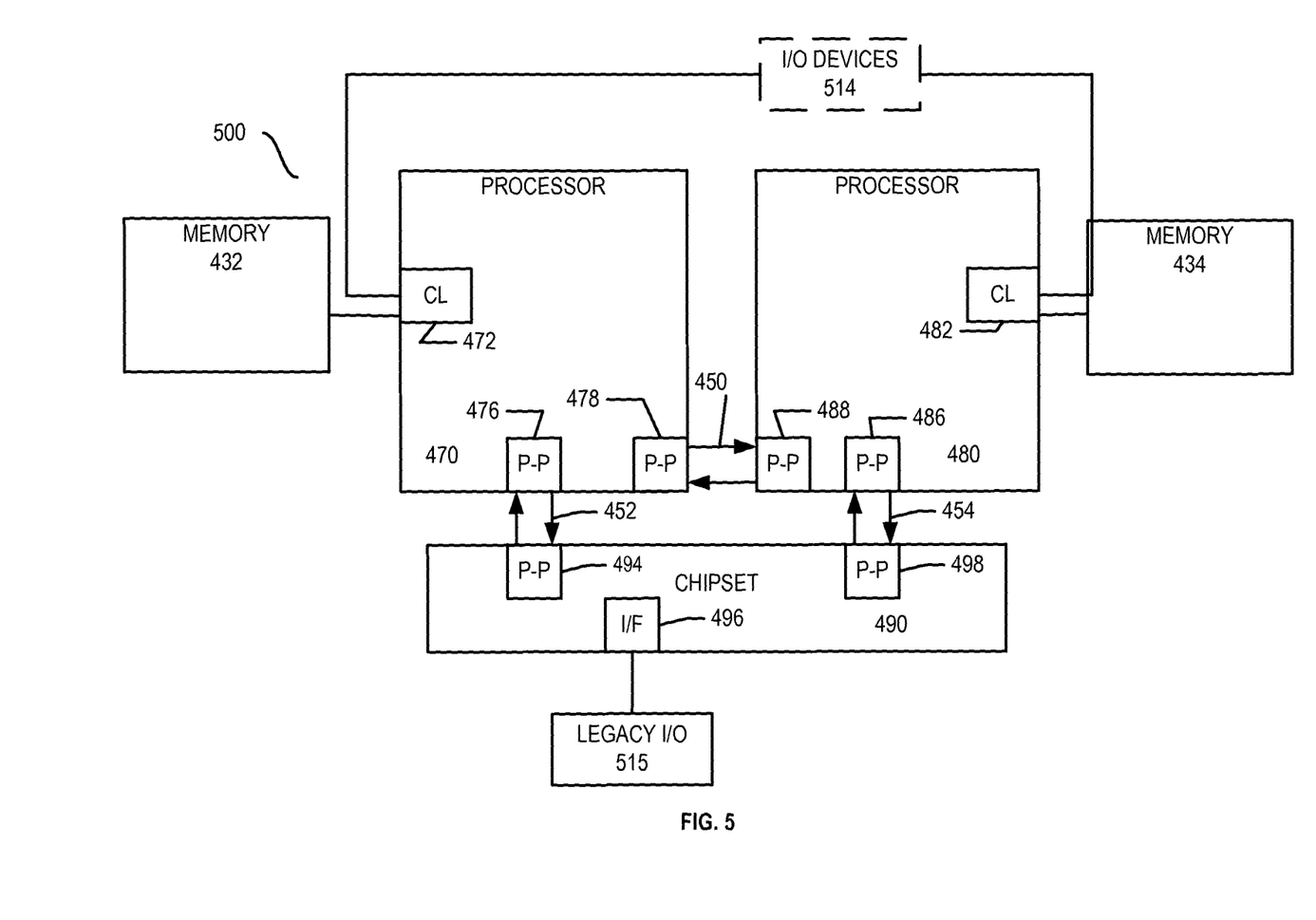
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
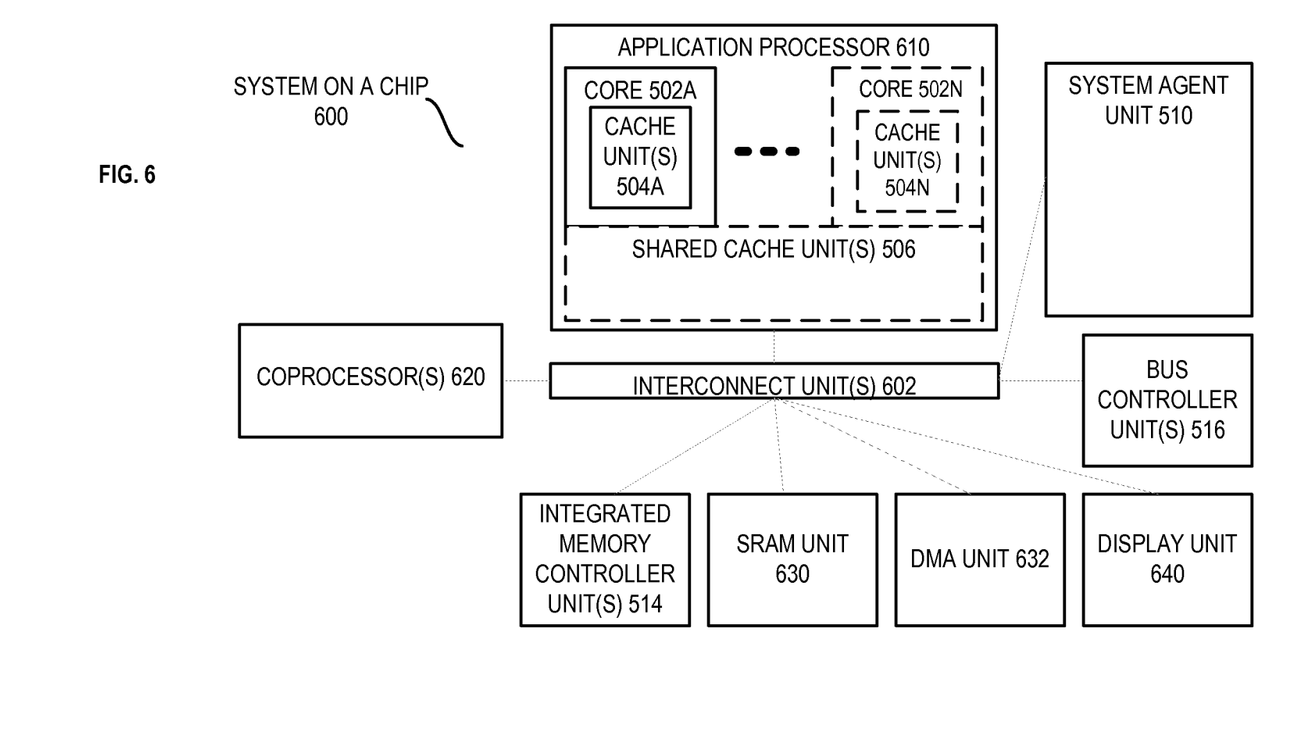
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
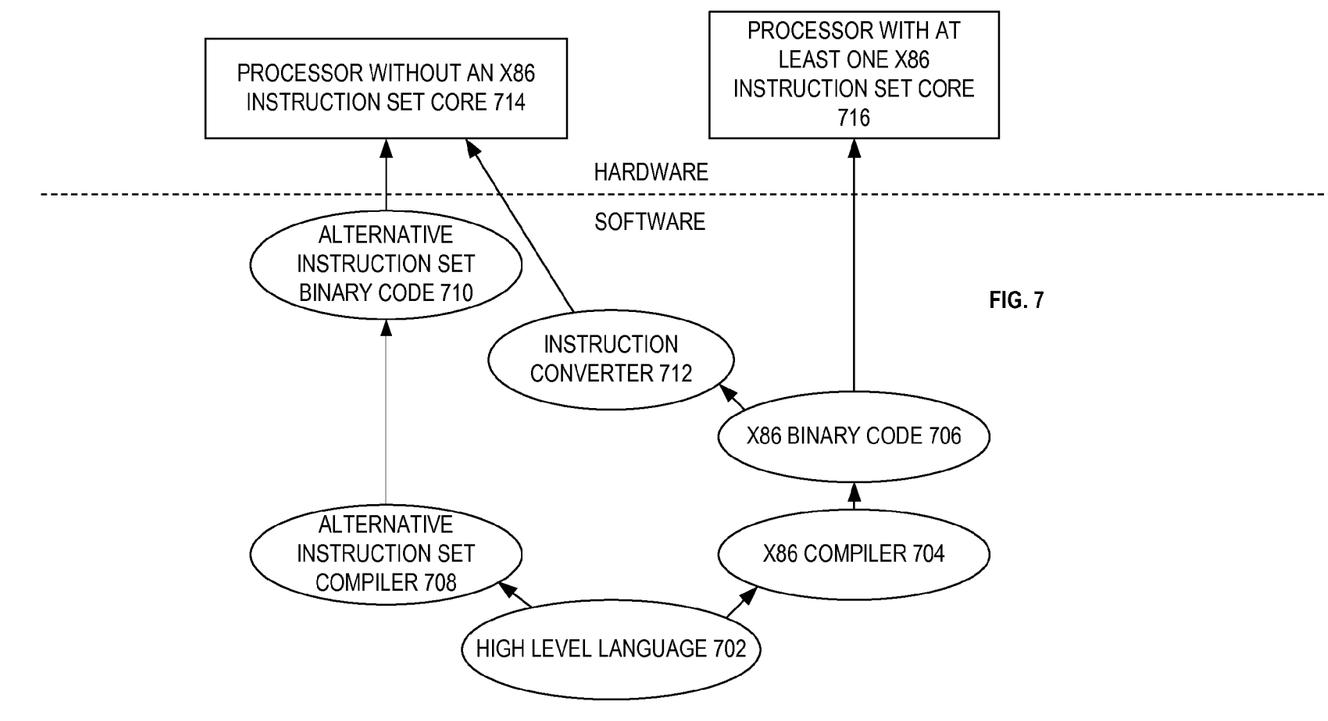
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Securing a Dynamic Binary Translation System

The embodiments described below provide stronger security for a hardware and software co-designed dynamic binary translation (BT) system using hardware, software, and firmware based security mechanisms. Unlike prior implementations which operate at single privilege level for accessing the processor resources (e.g., register states, memory regions, IO regions and the type of instructions), these embodiments operate at multiple privilege levels, thereby improving the security of the BT mechanisms and the security guarantees provided to the original translated code.

Figure 8:
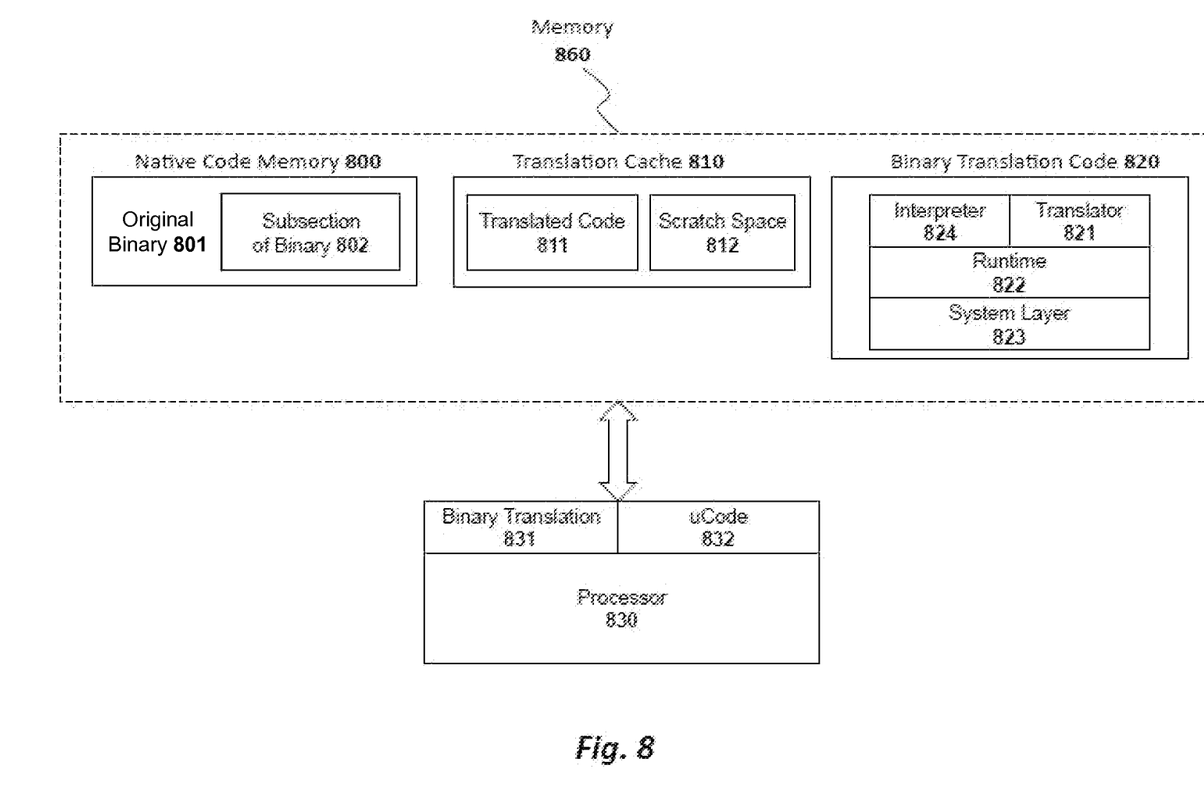
FIG. 8 illustrates a system architecture according to one embodiment of the invention.

FIG. 8 illustrates one embodiment of a co-designed hardware and software binary translation system. The system memory 860 is divided into a native code memory space 800, a translation cache space 810 and binary translation code space 820. The native code memory 800 is the memory space allocated for native software such as the BIOS software, operating system and applications. In one embodiment, the native software comprises x86 program code. However, the underlying principles of the invention are not limited to any particular instruction set architecture.

The binary translation code 820 includes a translator component 821 that transforms a subsection 802 of an original binary 801 of the native code memory 800 into translated code 811. In one embodiment, the subsection 802 comprises the entire original binary 801. In one embodiment, the translated code 811 is stored in a translation cache 810, which may be implemented as a dedicated memory space for the translated code 811. In one embodiment, when the translated code 811 executes, it may use a scratch space 812 to store temporary values.

A runtime component 822 (another sub-module of the binary translation code 820) provides runtime services and manages memory allocation and de-allocation for the translation cache 810. The system layer 823 is another sub-module of the binary translation code 820 that handles system-related events such as interrupts, exceptions and dispatches job requests to the rest of the binary translation modules. The interpreter 824 is an optional module employed in one embodiment in the binary translation code 820 that provides direct emulation of the original binary.

Although FIG. 8 shows one translation cache 810 and one processor 830 and one piece of translated code 811, it should be noted that the underlying principles of the invention are not so limited. For example, the translation cache 810 can contain several pieces of translated code 811, possibly from different binaries 801. Similarly, it is possible to have several translation caches 810 per processor 830 (e.g., one translation cache 810 per hardware thread). Other embodiments of the invention may be implemented across several processors.

Additionally, different embodiments of the invention may have different configurations of the system RAM 860 and the placement of the translation cache 810 and binary translation code 820. For example, a portion of the system RAM 860 may be embedded inside the processor as embedded DRAM (EDRAM) and a portion of the EDRAM memory storage may be allocated for the translation cache 810 and the binary translation code 820. In some configuration, the scratch space 812 may also be implemented as processor local storage.

Numerous security improvements are realized by the binary translation techniques described herein. Instead of operating at a single (highest) privilege level to access the processor 830 and system resources, in one embodiment, the binary translation system is operated using the following distinct operating modes, where each mode is provided with a different level of access to processor resources:

1. Binary translation code "supervisor" mode: In one embodiment, the system layer 823 of the binary translation code 820 runs in "supervisor" mode at the highest privilege level comprising the greatest number privileges for executing privileged instructions, blocking and handling events, modifying privileged registers, and accessing the processor and platform resources including platform memory 860.

2. Binary translation code "non-supervisor" mode: In one embodiment, the translator 821 and runtime 822 components of the binary translation code 820 are executed in "non-supervisor" mode and are provided with the lowest set of privileges for handling events and accessing the processor 830 and memory 860 when performing translations of the original binary code 801. In one embodiment, the translator 821 and runtime 822 are provided with only those privileges required to perform their respective tasks.

3. Translated Code Execution mode: In one embodiment, the translated code 811 runs in "translated code execution mode" at the same privilege levels provided to access the x86 memory and platform resources. In one embodiment, translated code is more trusted and provided more privileges than native execution code as translated code is execution-only code (not self-modifiable) and is produced by the binary translation code 820.

4. Native Execution mode: In one embodiment, the processor runs in native execution mode when executing the native binary code 801 from native code memory 800. In an x86 architecture, the native x86 code is provided the same operating privileges as defined by the x86 processor architecture. This mode may be optional when the binary translation system implements a full translation model (e.g., where the hardware does not provide native execution of the x86 ISA).

Thus, the processor 830 may provide different privileges depending on the currently executing mode. In one embodiment, binary translation logic comprising binary translation hardware extensions 831 and/or microcode 832 are implemented on the processor 830 to manage the different privilege levels. To mitigate control flow attacks, in one embodiment, the transitions among the different modes of operation are also controlled by the processor 830. For example, the processor 830 may manage the switching from one mode to the other using hardware-controlled entry points with binary translation logic 831 or microcode 832.

Transitions to "Supervisor" Mode

As mentioned above, portions of the binary translation code 820 operate either in either "supervisor" or "non-supervisor" mode. In one embodiment, "Supervisor" mode is used by the system layer 823 of the binary translation code and "non-supervisor" mode is used by the translator 821 and the runtime 822. The "supervisor" mode of the binary translation code operates with the highest privilege level. While the "supervisor" mode may be more privileged than the non-supervisor mode, this does not preclude certain resources, such as memory, instructions, and registers from being used only by the translator and runtime that operate in "non-supervisor" mode.

The processor 830 can enter to the "supervisor" mode of the binary translation code 820 from a mode that operates at a lesser privilege level including "non-supervisor" mode and "interpreter" mode of binary translation code, the Translated Code Execution mode and Native Execution mode. It may enter the supervisor mode in response to a certain event (e.g., an interrupt) or a condition that requires attention from the system layer 823 of the binary translation code 820.

In one embodiment, entry into the "supervisor" mode is controlled by hardware. Upon entry, the processor 830 context-switches to "supervisor" mode and starts executing the defined entry point of the binary translation code 820. The binary translation code 820 may examine the state, modify the state, and possibly switch to "non-supervisor" mode and invoke the translator 821 for performing a translation task on the original binary 801. As mentioned, in one embodiment, the supervisor mode may be used by the system layer 823 of binary translation code, and the non-supervisor mode may be used by the translator 821 and runtime 822 of the binary translation code.

Transitions Between "Supervisor" and "Non-Supervisor" Modes

Lowering the privileges for the translator 821 to "non-supervisor" mode allows the translator 821 to run with only those privileges that are essential for conducting the translation task, thereby reducing the security risk. For example, the translator 821 only needs to access the copy of the original binary, the state information of the original binary and allocated memory space for producing translated code. When the translator 821 produces the translated code 811, it may also produce metadata and control flow information associated with the translated code 811. The translator 821 may also embed instructions in the translated code 811 to clear the scratch space 812 or to validate the translated code 811. Upon completion of the translation task, the translator 821 transitions back to the system layer 823, switching from "non-supervisor" to "supervisor" mode by executing a special instruction, which enables a controlled gated entry to "supervisor" mode with the defined entry point of the system layer 823 code.

Based upon the metadata and control flow information the translator produced, the system layer 823 may update the processor 830 hardware structures such as the Jump Target Look-a-side buffer (JTLB) with the control flow information that enables transition between the native code execution and the translated code. The binary translation system may also update the hardware structures to detect self/cross modifying code conditions. After the binary translation system completes its tasks, it executes a special instruction to resume execution of the original binary 801 in native execution mode.

Special Exits from Binary Translation Code "Non-Supervisor" Mode

In order to minimize the transition overhead from "non-supervisor" mode in the binary translation code 820 to native execution mode, the hardware (e.g., microcode) based transition may be provided to enable direct transition back to the native execution mode from "non-supervisor" mode of the binary translation code where the hardware implements a necessary complete context operation to restore the context of the native execution.

Transitions Between Native and Translated Code

Transitions from native to translated code hardware are controlled by processor hardware such as jump target look-a-side buffer (JTLB) which, in one embodiment, provides a translated target address for a given x86 target address and enables transition to the translated code execution. Transitions from translated code back to native code are either done by a hardware/microcode mechanism or a special instruction executed by the translated code.

Figure 9:
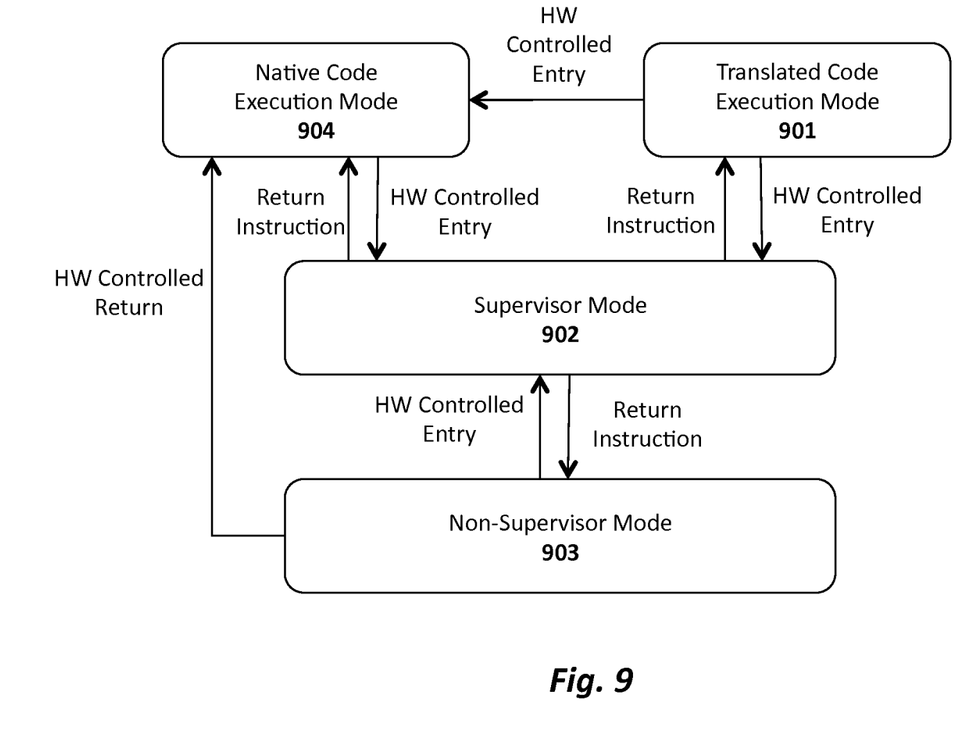
FIG. 9 illustrates transitions between different modes in accordance with one embodiment.

FIG. 9 provides an illustration of the different modes and their transitions according to one embodiment. At 901, the system is operating in translated code execution mode 901 and may enter into either native code execution mode 904 or supervisor mode 902 under hardware control (e.g., via hardware-controlled entry points using binary translation logic 831 or microcode 832). Supervisor mode 902 may also be entered from non-supervisor mode 903 under hardware control. In addition, native code execution mode 904 may be entered from either non-supervisor mode 903 or translated code execution mode 901 via hardware control.

In one embodiment, a return instruction may be executed to exit supervisor mode 902 and return to the native code execution mode 904, translated code execution mode 901, or non-supervisor mode 903. In one embodiment, a different variant of the instruction or the same instruction with different parameters may be executed (i.e., with each variant or set of parameters identifying a different mode of operation 901, 903, 904).

Operating Modes and Privileges

In one embodiment, to mitigate the security risk, the privileges of each mode are defined with the principle of least privilege. For example, the principle of least privilege requires that in a particular layer of abstraction in a computing environment, every module (e.g., process, user or program) must be able to access only that information and resources which are necessary for its legitimate purpose.

Additionally, the translated code execution mode may be forced to run with the same privileges as those of the original binary 801, in order to mitigate attacks by translated code 811. The data address space of translated code 811 may be identical to that of the original binary 801. In one embodiment, translated code does not gain access to the code and data memory of the binary translation code 820. Moreover, translated code is not self-modifiable and may only be modified by the translator. The protection domains provided for the original binary such as ring level protections, user/kernel mode, etc., may also be preserved for translated code execution. For example, the translated code executed at CPL3 cannot access the memory range that is only assessable by the CPL0 original code.

Read and write access to scratch space 812 may be implemented with special instructions that are not included in the instruction set architecture of the original binary 801. These instructions may be inserted into translated code 811 only by the translator 821 for the purpose of conducting register allocations. The instruction address space of translated code 811 is logically separated from the instruction's and data's linear address space of the original program. Therefore, the translation cache 810 memory space is not visible and inaccessible from the original binary 801. The protection of the physical translation cache 810 memory space from the original binary 801 may be implemented with a hardware mechanism. On any exception during translated code execution or after execution of the instruction that causes exit, the processor 830 resumes execution of the original binary 801.

The following table shows an example implementation of the operating modes and given privileges in hardware software co-designed binary translation system:

|  | X86 |  | BT software |  |  |  |  | Translation Memory |  |
|---|---|---|---|---|---|---|---|---|---|
|  |  |  | Supervisor |  |  | Non-supervisor |  |  |  |
|  | code | data | Special ISA | code | data | code | data | code | scratch |
| BT Software "supervisor" mode | R-- | — | Yes | R-X | RW- | R-X | RW- | RW- | RW- |
| BT Software "non-supervisor" mode | — | — | No | — | — | R-W | RW- | — | — |
| Translated code execution mode | R-- | RW- | No | — | — | — | — | --X | RW- |
| Native Execution mode | R-X | RW- | No | — | — | — | — | — | — |

Notes:
1. R, W, and X means Read, Write and Execute permissions, respectively.
2. In x86 code and data, RWX permissions are only given when OS and VMM give such accesses While some embodiments discussed herein provide "supervisor" and "non-supervisor" modes with different privileges for the binary translation code, the underlying principles of the invention are not limited to only two privilege levels. For example, the interpreter 824 of the binary translation code, if it is present, may operate in another separate mode with different privileges. Similarly, not all operating modes need to be present. For example, the full translation model may not have the native execution mode and the interpreter 824 may replace the function of the native execution mode. A partial translation model may not have the transition paths between the translated code execution and binary translation code "supervisor" mode. Though each hardware and software co-designed binary translation system instance may have variances in its configurations, the same principle can be applied to make the hardware/software co-designed processor more secure and less vulnerable to malicious attacks.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
   entering into one of a plurality of privilege modes responsive to detecting execution of a corresponding one of a plurality of different types of program code including original binary program code, translated executable program code, and binary translation program code, wherein the binary translation program code is to be executed in one of a plurality of privilege modes, each for one or more of a plurality of sub-components of the binary translation program code, and each being different from one another.

2. The method as in claim 1, the method further comprising:
   entering into a first privilege mode responsive to detecting execution of a first sub-component of the binary translation program code; and
   entering into a second privilege mode responsive to detecting execution of a second sub-component of the binary translation program code.

3. The method as in claim 1 wherein the sub-components include a translator sub-component, a runtime sub-component, and a system sub-component.

4. The method as in claim 3 further comprising:
   entering into the first privilege mode responsive to detecting the execution of the translator sub-component or runtime sub-component; and
   entering into the second privilege mode responsive to detecting the execution of the system sub-component of the binary translation program code.

5. The method as in claim 4 wherein the second privilege mode provides relatively more privileges than the first privilege mode.

6. The method as in claim 1 wherein entering into comprises transitioning from a first one of the plurality of privilege modes associated with a first one of the plurality of different types of program code to a second one of the plurality of privilege modes associated with a second one of the plurality of different types of program code responsive to a transition from execution of the first one of the plurality of different types of program code to the second one of the plurality of different types of program code, respectively.

7. The method as in claim 6 wherein transitioning comprises executing a return instruction.

8. The method as in claim 6 wherein transitioning comprises executing a hardware-controlled return.

9. A processor comprising:
   random access memory to store program code; and
   binary translation logic, coupled to the random access memory, to cause entry into one of a plurality of privilege modes responsive to detecting execution of a corresponding one of a plurality of different types of program code including original binary program code, translated executable program code, and binary translation program code, wherein the plurality of different types of program code is stored in the random access memory, wherein the binary translation program code is to be executed in one of a plurality of privilege modes, each for one or more of a plurality of sub-components of the binary translation program code, and each being different from one another.

10. The processor as in claim 9, the binary translation logic to perform the operations of:
    entering into a first privilege mode responsive to detecting execution of a first sub-component of the binary translation program code; and
    entering into a second privilege mode responsive to detecting execution of a second sub-component of the binary translation program code.

11. The processor as in claim 9 wherein the sub-components include a translator sub-component, a runtime sub-component, and a system sub-component.

12. The processor as in claim 11 wherein the binary translation logic is to further perform the operations of:
    entering into the first privilege mode responsive to detecting the execution of the translator sub-component or runtime sub-component; and
    entering into the second privilege mode responsive to detecting the execution of the system sub-component of the binary translation program code.

13. The processor as in claim 12 wherein the second privilege mode provides relatively more privileges than the first privilege mode.

14. The processor as in claim 10 wherein entering into comprises transitioning from a first one of the plurality of privilege modes associated with a first one of the plurality of different types of program code to a second one of the plurality of privilege modes associated with a second one of the plurality of different types of program code responsive to a transition from execution of the first one of the plurality of different types of program code to the second one of the plurality of different types of program code, respectively.

15. The processor as in claim 14 wherein transitioning comprises executing a return instruction.

16. The processor as in claim 14 wherein transitioning comprises executing a hardware-controlled return.

17. A system comprising:
    a memory for storing program code and data;
    a input/output (JO) communication interface for communicating with one or more peripheral devices;
    a network communication interface for communicatively coupling the system to a network; and
    a processor comprising binary translation logic to cause entry into one of a plurality of privilege modes responsive to detecting execution of a corresponding one of a plurality of different types of program code including original binary program code, translated executable program code, and binary translation program code, wherein the binary translation program code is to be executed in one of a plurality of privilege modes, each for one or more of a plurality of sub-components of the binary translation program code, and each being different from one another.

18. The system as in claim 17, the binary translation logic to perform the operations of:
    entering into a first privilege mode responsive to detecting execution of a first sub-component of the binary translation program code; and
    entering into a second privilege mode responsive to detecting execution of a second sub-component of the binary translation program code.

19. The system as in claim 17 wherein the sub-components include a translator sub-component, a runtime sub-component, and a system sub-component.

20. The system as in claim 19 wherein the binary translation logic is to further perform the operations of:

entering into the first privilege mode responsive to detecting the execution of the translator sub-component or runtime sub-component; and entering into the second privilege mode responsive to detecting the execution of the system sub-component of the binary translation program code.

21. The system as in claim 20 wherein the second privilege mode provides relatively more privileges than the first privilege mode.

22. The system as in claim 18 wherein entering into comprises transitioning from a first one of the plurality of privilege modes associated with a first one of the plurality of different types of program code to a second one of the plurality of privilege modes associated with a second one of the plurality of different types of program code responsive to a transition from execution of the first one of the plurality of different types of program code to the second one of the plurality of different types of program code, respectively.

23. The system as in claim 22 wherein transitioning comprises executing a return instruction.

24. The system as in claim 22 wherein transitioning comprises executing a hardware-controlled return.

* * * * *